United States Patent
Baynes et al.

(10) Patent No.: US 9,155,963 B2
(45) Date of Patent: Oct. 13, 2015

(54) COLLABORATIVE ONLINE RANKING

(75) Inventors: Nick Baynes, Brighton (GB); Serkan Hassan, Brighton (GB)

(73) Assignee: Disney Enterprises, Inc., Burbank, CA (US)

( * ) Notice: Subject to any disclaimer, the term of this patent is extended or adjusted under 35 U.S.C. 154(b) by 866 days.

(21) Appl. No.: 12/626,358

(22) Filed: Nov. 25, 2009

(65) Prior Publication Data

US 2011/0124417 A1    May 26, 2011

(51) Int. Cl.
*A63F 13/30* (2014.01)

(52) U.S. Cl.
CPC ........... *A63F 13/12* (2013.01); *A63F 2300/558* (2013.01)

(58) Field of Classification Search
USPC ...................... 463/9, 42–43, 6, 23, 30; 700/91
See application file for complete search history.

(56) References Cited

U.S. PATENT DOCUMENTS

| 7,090,577 | B2* | 8/2006 | Serizawa et al. | 463/6 |
| 7,736,220 | B2* | 6/2010 | Mori | 463/6 |
| 2002/0093168 | A1* | 7/2002 | Hibbert | 280/124.1 |
| 2002/0169013 | A1* | 11/2002 | Serizawa et al. | 463/6 |
| 2003/0093168 | A1* | 5/2003 | Nagaoka | 700/91 |

* cited by examiner

*Primary Examiner* — Masud Ahmed
(74) *Attorney, Agent, or Firm* — Patterson + Sheridan, LLP

(57) ABSTRACT

A system, method and article for ranking a gaming session between a plurality of independent player game components. A method includes receiving one or more gaming session metrics determined at each of a group of the game components participating in a gaming session; calculating a quality metric for the gaming session based on the one or more gaming session metrics received from the group of game components; and storing the quality metric for ranking the gaming session.

22 Claims, 5 Drawing Sheets

COLLABORATIVE ONLINE RANKING

BACKGROUND

1. Field

The invention is concerned with the operation of interactive computer games on a network. The invention is particularly concerned with the operation of interactive computer games where multiple players may participate in a gaming session, and with the provision of scores for a gaming session.

2. Description of the Related Art

The general architecture to support an interactive computer gaming session between multiple users in a network environment is illustrated in FIG. 1. Such an architecture, and variations thereto, is well-known to one skilled in the art.

As used herein the term computer gaming session encompasses any length of time spent playing a game. A computer gaming session may, for example, be a completed game, a completed level of a game, a completed race of a racing game, a completed lap of a race in a racing game or any other section of a game. A gaming session may be measured in units of time or in discrete game sections.

FIG. 1 illustrates three computer game terminals 2a, 2b, 2c. Each terminal is connected to each other terminal via respective network connections 4a, 4b, 4c and a network 6. The network 6 may be the Internet. A game server 8, supporting a player matching service, is also connected to the network 6 via a network connection 10. With reference to FIG. 2 there is illustrated a general architecture of a typical computer game terminal 2a. Each computer game terminal typically includes a computer game console 12 or hardware device, a player/user input device or controller 14 connected to the computer game hardware device 12, and a display 16 connected to the computer game hardware device. The computer game console 12 is adapted for connection to the network via connection 4a. Although in the example shown the controller 14 and display 16 are shown as distinct from the console 12, the computer game terminal 2a may be implemented in a variety of ways, for example with the controller, display and console forming a single integrated device.

The game console 12 includes a central processor 18 and a network interface 20. The central processor 18 provides the computation required to allow a player to take part in an interactive computer gaming session by processing instructions from the controls and providing instructions to the display 16 to allow the features of the game to be displayed to the player. The network interface 20 transmits and receives information relating to the game and the computer game terminal 2a over the network 6.

The player matching service provided by the game server 8 allows for details of interactive games to be uploaded thereto, so as they may be displayed to other users. A player, such as a player associated with computer game terminal 2a, may initiate a new interactive game, and upload details to the game server 8. The purpose of the player matching service is to enable other players to join the initiated game. The game matching service may display such details as the identity of the game to be played, the identity of the game host (i.e. the player initiating the game), and details of any other players who have registered to play the game. The gaming matching service operates to facilitate matching of players for an online gaming session, and has no involvement in the playing of the game.

Once the players for the game are registered, the communication between the computer game terminals of the registered players is on a peer-to-peer network basis. The specific communications between the computer game terminals during a game may vary. Each computer game terminal may operate autonomously and generate its own graphics for display, based on information received on the peer-to-peer network. Each computer game terminal therefore needs to receive data associated with user inputs from all other players in the game. For example, this may be done by each computer game terminal transmitting the user input data at its terminal to all other players, or by all computer game terminals transmitting their data to the host system, which in turn transmits it to the other computer game terminals.

It is known in the art for online computer gaming sessions to give rise to leaderboards that are available to all computer game terminals over the network. The concept of scoring and ranking players in videogames of the art is exclusively done on an individual basis. Players are driven by a desire to be the best and use leaderboards to prove their claims. Each online player aims to appear on a leaderboard but, due to high volumes of players this is difficult to achieve. The majority of players achieve relatively lowly positions on leaderboards and so are not motivated to continue playing the game.

There exists a need to provide a method of operating an interactive computer game that may provide greater motivation for players to continue playing the game.

SUMMARY

The invention provides in a gaming environment a way of providing a cumulative quality ranking for a gaming session, based on its appeal to players and an audience, which is independent of any single player score.

The invention provides a method of operating an interactive computer game comprising a plurality of independent player game components in a gaming session, the method comprising: receiving one or more gaming session metrics determined at each of a group of the game components participating in the gaming session; calculating a quality metric for the gaming session based on the one or more gaming session metrics received from the group of game components; and storing the quality metric for ranking the gaming session.

The quality metric can be calculated as a cumulative score of the gaming session metrics.

Independent player game components implement play of an individual player in the session. They are "independent" in the sense that each player has his own personal objectives in the game. A game component can be executed at a game terminal, or multiple game components can be executed at a game terminal.

The invention is therefore able to provide a cumulative score of the gaming session metrics from a plurality of computer game terminals. As such, the gaming session itself may be scored in addition to the performance of the individual. In this, way players of less ability are able to contribute to a gaming sessions that rate highly. This gives an incentive to those players to continue playing the game.

The one or more gaming session metrics may comprise individual player scores from the gaming session. These may be calculated from one or more of the following: racing car drift scores; racing car jumping scores; slipstreaming scores; dodging hazards; use of power plays; racing car lap times; final race classifications; damage suffered by players; damage inflicted to other players; or opening up hidden areas of a game.

The one or more gaming session metrics may comprise player interaction scores from the gaming session. These may be calculated from one or more of the following: the number of times that the lead changes hands; the gap between one or more players; the number of overtaking manoeuvres; the number of crashes; and the nature of crashes.

The one or more gaming session metrics may be determined at each of the group of terminals and transmitted to the game server in real-time during the gaming session. The method of the invention may further comprise the step of accessing over the network data associated with the gaming session by one or more of the plurality of computer game terminals during the gaming session.

This provides the advantage that computer game terminals are able to access information on a gaming session during the gaming session. This may encourage spectators to watch a particular gaming session or even join in the playing of a particular gaming session if that session appears to be scoring highly.

The method of the invention may further comprise the step of generating and displaying at the game server a leaderboard comprising the scores of a plurality of computer gaming sessions.

The gaming session metrics used to calculate the scores in the leaderboard may be filtered to select specific gaming session metrics. This allows gaming sessions on the leaderboard to be ranked according to one or more of the gaming session metrics.

The invention provides a system for operating an interactive computer game comprising: a plurality of independent player game components participating in a gaming session, each configured to determine one or more gaming session metrics; and a processing component configured to calculate and store a quality metric for the gaming session based on the one or more gaming session metrics received from a group of the game components, for ranking the gaming session.

The one or more gaming session metrics may comprise individual player scores from the gaming session. The individual player scores may be calculated from one or more of the following: racing car drift scores; use of power plays; racing car lap times; final race classifications; damage suffered by players; damage inflicted to other players; or opening up hidden areas of a game.

The game server may be configured to calculate the cumulative score for the online computer gaming session by accumulating the individual player scores from a plurality of players.

The one or more gaming session metrics may comprise player interaction scores from the gaming session. The player interaction scores may be calculated from one or more of the following: the number of times that the lead changes hands; the number of overtaking manoeuvres; the number of crashes; and the quality of crashes.

Each of the group of terminals may be further configured to transmit the determined gaming session metrics to the game server in real-time during the gaming session. Each of the plurality of computer game terminals may be configured to access over the network data associated with the gaming session during the gaming session.

The game server may be further configured to generate and store a leaderboard comprising the scores of a plurality of computer gaming sessions.

The invention provides a computer game terminal for operating an interactive computer game on a network comprising a plurality of computer game terminals connected to each other and to a game server, the computer game terminal comprising: a game console comprising a central processor configured to determine one or more gaming session metrics in an online computer gaming session and a network interface connected to the network and configured to transmit over the network the one or more gaming session metrics to the game server, wherein the gaming session metrics comprise at least one individual player score and at least one player interaction score.

The invention provides a game server for managing an interactive computer game connected in a network to a plurality of computer game terminals, the game server comprising: a network interface connected to the network and configured to receive gaming session metrics from each of a group of terminals participating in the online gaming session; a score calculation means connected to the network interface and configured to calculate a quality metric for the online computer gaming session based on the gaming session metrics; and a memory configured to store the quality metric.

The invention provides a computer program embodied on a computer readable medium for operating an interactive computer game on a computer game terminal in a network comprising a plurality of computer game terminals connected to each other and to a game server, the computer program when executed performing the steps of: determining one or more gaming session metrics at the terminal; and transmitting over the network the one or more gaming session metrics from the terminal to the game server wherein the gaming session metrics comprise at least one individual player score and at least one player interaction score.

The invention provides a computer program embodied on a computer readable medium for operating a game server in a network comprising a plurality of computer game terminals connected to each other and to the game server, the computer program when executed performing the steps of: receiving at the game server one or more gaming session metrics from each of a group of terminals participating in an online gaming session; and calculating and storing a quality metric for the online computer gaming session based on the gaming session metrics, for ranking the gaming session.

The invention will now be described by way of example with reference to the accompanying figures.

DESCRIPTION

The invention provides a method of operating an interactive computer game that gives a better assessment of the performance of all players within a gaming session and provides an indication of the quality of a gaming session. Current leaderboards give no indication of the performance of all players in a gaming session nor do they give any indication of how the players interacted with each other.

The invention is described herein by way of reference to particular examples and preferred embodiments. The invention is not limited to any aspects of such examples and preferred embodiments. The examples and preferred embodiments are presented for the purpose of illustrating the concepts of the invention and for ease of understanding of the invention, and do not limit the scope of the invention.

The invention is described below with reference to a racing game format. However, this is for illustrative purposes only and does not limit the scope of the invention. It will be appreciated that the invention may be used in conjunction any computer game format.

Figure 1:
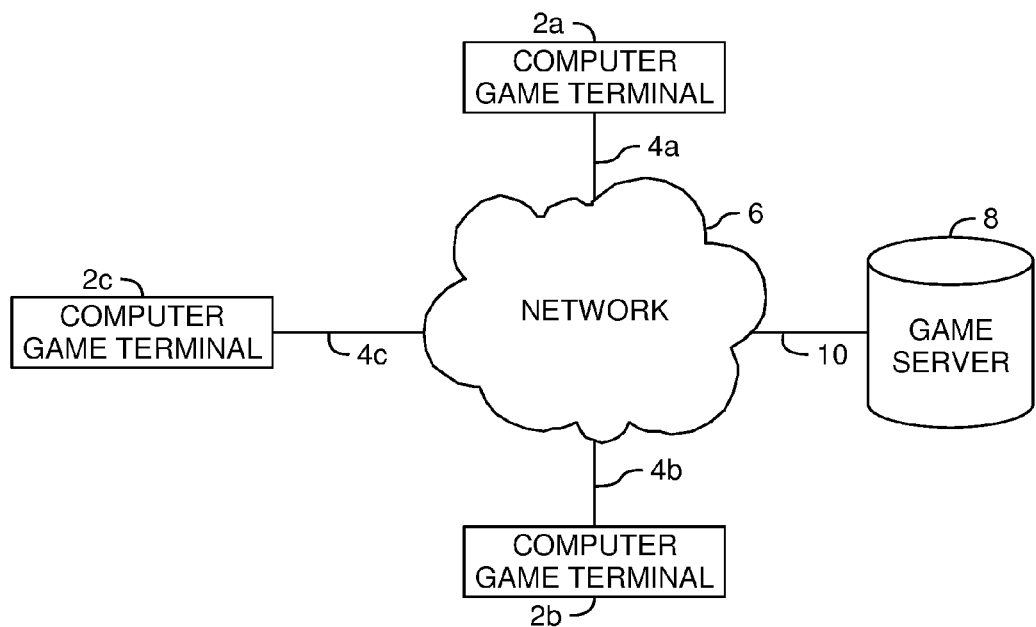
FIG. 1 illustrates a general architecture to support an interactive computer gaming session between multiple users in a network environment.
Figure 2:
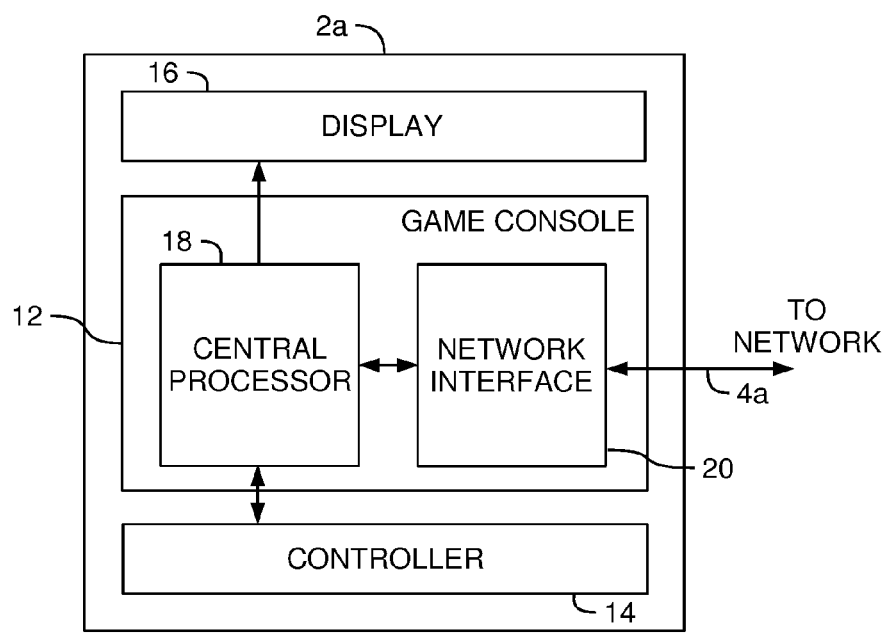
FIG. 2 illustrates a general architecture of a computer game terminal for use in a network environment to support an interactive computer gaming session.
Figure 3:
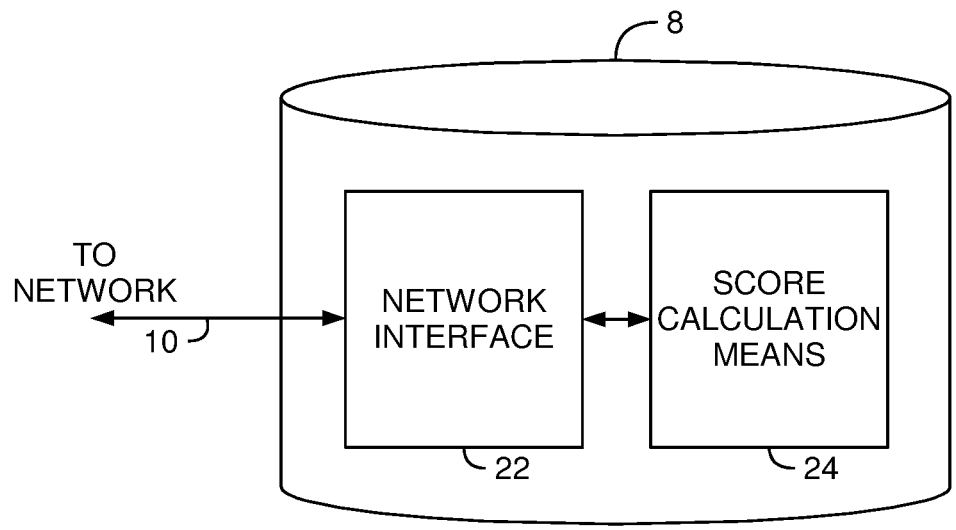
FIG. 3 illustrates a general architecture of a game server for use in a network environment to support an interactive computer gaming session.

The invention provides a method of operating an interactive computer game on a network. Referring to FIGS. 1, 2 and 3 a network comprises a plurality of computer game terminals 2a, 2b, 2c and a game server 8. The computer game terminals 2a, 2b, 2c and the game server 8 are connected to each other via a network 6 as is known in the art. The network arrangement of FIG. 1 allows a player using one of the computer game terminals 2a, 2b, 2c to initiate and/or register for involvement in an online gaming session as described above. Each terminal executes an independent player game component and displays the gaming session on a screen.

Referring to FIG. 2 the general architecture of a computer game terminal 2a includes a central processor 18 and network interface 20. The central processor 18 is connected to the network interface 20, which is connected to the network 6 via a network connection 4a. Referring to FIG. 3 the game server 8 includes a network interface 22 and a score calculation means 24. The score calculation means 24 is connected to the network interface 22, which is connected to the network 6 via a network connection 10.

Alternatively a split screen architecture is possible where multiple game components can be executed for display on different parts of a common screen or display.

Computer game terminals of the art are adapted to run software for playing interactive computer games. As used herein, the term "racing game" relates to such software that may be run on the central processor 18 of the games console 12. A racing game may provide a game in which a plurality of game characters compete to win a race around a course. The game characters may be player controlled and/or computer controlled.

In a preferred embodiment of the invention the central processor 18 of each computer game terminal 2a, 2b, 2c is adapted to determine one or more gaming session metrics. Further, the network interface 20 of each computer game terminal 2a, 2b, 2c is adapted to transmit the gaming session metrics over the network 6 to the game server 8. The game server 8 is adapted to receive the one or more gaming session metrics and calculate a quality metric, for example a cumulative score, for the online computer gaming session based on the gaming session metrics.

It will be appreciated that one of the game terminals can act as the game server.

As used herein the term "gaming session metrics" encompasses any measure of performance, entertainment value or gaming session quality within a game environment. For example, gaming session metrics may include individual player scores and/or player interaction scores and various statistics that characterize a particular gaming session. Individual player scores include any score associated with a player in isolation. Player interaction scores are those scores that are dependent on a plurality of players. Gaming session metrics are explained in greater detail below.

Figure 4:
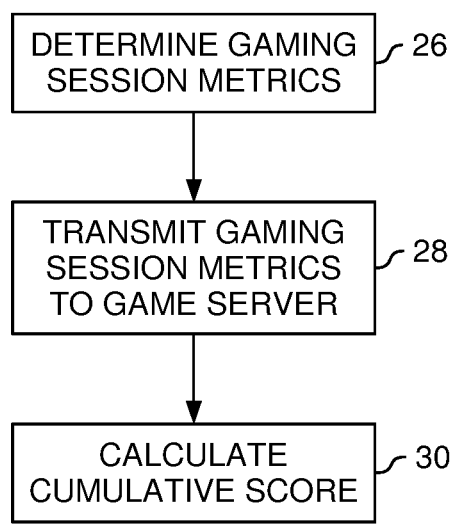
FIG. 4 shows a flow diagram of the main process steps for operating an interactive computer game.

FIG. 4 is a flow diagram showing the main process steps of a preferred embodiment of the invention. Gaming session metrics are determined 26, the gaming session metrics are then transmitted to the game server 28 and a quality metric is calculated 30.

The determination of the gaming session metrics is undertaken in the central processor 18. The central processor 18 monitors the gameplay of all players that are using the computer game terminal 2a to play in an online gaming session. It will be appreciated that more than one player may use a single computer game terminal at one time. When multiple players are using a single computer game terminal, additional controllers 14 may be required.

The central processor 18 records the scores relating to one or more gaming session metrics. The gaming session metrics may be stored in a memory of the computer game terminal 2a. The memory may be integrated into the computer game terminal 2a or may be external to the computer game terminal 2a. It will be apparent to those skilled in the art that the memory may be a hard disk drive, a flash drive or any other suitable data storage device.

As stated above the gaming session metrics may include individual player scores and/or player interaction scores.

Individual player scores are determined based on a player's performance during the gaming session, which can be assessed using a number of different scoring methods.

When players compete against each other in an online computer gaming session, each earns an individual score, based on their actions and their final position amongst their rivals. The invention may take the scores from each player and produce a cumulative score for a gaming session. The higher the score, the more entertaining a gaming session has been. As a result, it is feasible that average or less skilled players will achieve fame and success by association, as they took part in the same gaming session as exceptional players.

The following are examples of how a player may earn points in a gaming session:

Drifting/sliding around corners of a course;
Jumping;
Slipstreaming a rival player;
Dodging hazards;
Use of power plays;
Racing car lap times;
Damage suffered by players;
Damage inflicted to other players;
Making a rival player crash;
Finishing position in the gaming session; and/or
Opening up hidden areas of the game.

Racing games of the art calculate the time taken for a player's vehicle to complete sections of a race. The sections may be sections of a lap of a course, a lap of a course or an entire race comprising one or more laps of a course. Player timings for the completion of races and laps, and split times are recorded in racing games of the art. The skilled person would readily understand how this would be achieved.

According to embodiments of the invention an individual player score may be determined using a scoring method associated with the timings achieved by a player when racing around a course. For instance an individual player score may be attributed to an individual player based on the time to complete an entire race. The lower the time taken, the higher the score attributed to the player. Individual player scores may also be attributed to a player for the time taken to complete a lap, or for split times recorded on completion of sections of a lap.

According to other embodiments of the invention players may also achieve an individual player score based on scoring methods related to other attributes of their gameplay. For instance a player may score points if they manage to drift their car or other vehicle around the corners of a course. In this context, drifting relates to the sideways motion of a car as it negotiates a corner at high speed.

The racing game may monitor the motion of a player's vehicle during the game, in particular recording the amount of time spent drifting around the corners of the track. The racing game may then attribute an individual player score based on the amount of drifting by the vehicle. The longer the drift the more points an individual player may achieve toward their score.

In accordance with other embodiments of the invention alternative scoring methods allow players to achieve a score for the use of power plays within the game environment. Power plays may be gained during a gaming session by e.g. completing certain sections of the game, collecting icons, or by performing manoeuvres or tricks within the gaming session. When a player has gained a power play they may have the option to use it at their discretion. A racing game may monitor a player and note the time and/or position on the course at which the player chooses to initiate a power play. The racing game may ascertain the effectiveness of the power play by noting the events that immediately follow its initiation.

For instance, a power play may allow a player to inflict damage on an opponent. Therefore, in accordance with the invention, the racing game may monitor the damage inflicted to opponents following, and as a result of, the initiation of a power play. The more damage that is inflicted the more points the player will score for the use of the power play. Alternatively a power play may permit a player to use increased speed, or some other advantageous feature, in order to e.g. overtake opponents or increase jump height and length. The racing game may therefore monitor the number of opponents overtaken, or the height and length of a jump, following the initiation of a power play. By using the power play at an opportune time, and generating a greater effect, the player may score highly.

Damage may also be inflicted to an opponent in other ways, e.g. by ramming the opponent or by running them off the track. Therefore, in accordance with the invention another scoring method may award points to an individual player for inflicting damage to an opponent in such a way. The racing game may assess the amount of damage to an opponent both before and after a collision and award points for the amount of damage inflicted. In additional embodiments of the invention an individual player score may be awarded for causing an opponent to crash. The score awarded may therefore not be related to the amount of damage inflicted.

Individual player scores may also be achieved based on players' final race positions. The higher the final position the greater the individual player score.

In addition to the scoring methods mentioned above, an individual player score may be awarded in accordance with the invention for opening up hidden areas of a game. Many games have contained within them hidden areas that may only be opened up or revealed to players following completion of a set sequence of events. For instance, a player may initiate an explosion in a certain area of a race track that will reveal an area of the track that was not previously viewable by the players. The hidden game area may provide a short cut or an alternative route through the course. Once hidden areas of the game are revealed to the players they may be open for all players to use. The revealing of hidden areas may contribute points to a players individual player score.

A single individual player score may be determined at the central processor 18 of a computer game terminal 2a based on one or more scoring methods. Alternatively, a plurality of individual player scores may be determined, each of the plurality of individual player scores being based on one or more scoring methods. The plurality of individual player scores may relate to one or more players.

In car racing games, such as Split Second, a player may be rewarded if he slipstreams a rival opponent. In this respect the term "slipstream" relates to a player positioning themselves behind a rival player in a racing game such that the wind resistance for the player is reduced with respect to the rival player. The player is thereby able to generate greater velocity for themselves. In accordance with the invention an individual player score may be determined based on a player slipstreaming a rival player. An individual player score may be determined based on the amount of time that the player spends in a rival player slipstream. An individual player score may also be determined based on the amount of extra velocity generated by a slipstreaming manoeuvre.

Players of racing games of the art may be required to perform jumps as they progress around a course. In accordance with the invention an individual player score may be determined based on such jumps. The individual player score may be determined based e.g. on the length of a jump, the height of a jump, the amount of time a player spends in the air following a jump and/or tricks performed during a jump.

Player interaction scores may also be determined through a number of different scoring methods. Generally, player interaction scores relate to those features of a gaming session that are not reflected in individual player scores but which contribute to the overall score that may be attributed to a gaming session.

The invention is not limited to cumulative scores based on the individual player scores of competing players. The data from each gaming session may also be analysed in other ways which can add to the total score that is achieved. Data is extracted from the session based on examples such as:
  How many lead changes were there during the game?
  How many overtaking manoeuvres where there?
  What was the gap (in terms of score or time) between one or more players?
  How many crashes were there?
  What was the nature of the crashes?

The above represent examples of the potentially huge range of data that could be extracted from the gaming session in order to enhance the score attributed to a gaming session. The skilled person would understand that the invention is not limited to the examples provided above but may be implemented using any gaming session attribute.

Racing games of the art are able to monitor and display the position of players within a race environment, i.e. whether they are first, second, third etc.

In accordance with embodiments of the invention player interaction scores may be determined based on the gap between one or more players of a racing game. In this respect the gap may be the difference in player times for a gaming session and/or the difference between player scores in a gaming session. For example a player interaction score may be determined based on the time difference between the first placed player and the last placed player. A smaller time difference may indicate a more exciting gaming session and may therefore attract a higher player interaction score.

In accordance with other embodiments of the invention player interaction scores may be awarded based on a scoring method relating to the amount of times the lead and/or player positions change hands in a race. Every time the lead changes hands an overtaking manoeuvre must have taken place. A racing game may therefore note and record the number of changes in player positions over the course of a race. A score may be awarded to a gaming session based on the number of such occurrences. The entertainment value and quality of a gaming session may be linked to the number of overtaking manoeuvres in the session and, therefore, a higher score may be awarded for gaming sessions in which the lead changes hands often.

In accordance with other embodiments of the invention player interaction scores may be determined using a scoring method based on the number of crashes in a gaming session. Crashes may not typically contribute to the individual player scores mentioned above. However, if a high number of crashes occur in a gaming session then the entertainment value of the session may be high. A racing game may therefore record the number of crashes within a gaming session and a score may be awarded to the gaming session based on that number. In addition the nature of the crashes may also be a factor in determining player interaction scores. The nature of the crashes in a gaming session may give an indication of the entertainment value or the quality of the session. For instance crashes at high velocities or spectacular crashes may be of greater entertainment value to players and spectators of a gaming session. This may therefore contribute to the player interaction score. A racing game may therefore attribute a score to crashes based on the velocity differential between two vehicles involved in a crash. If one vehicle is stationary or moving in the opposite direction to another vehicle at the time of a crash then this will lead to a large velocity differential, which may, in turn, lead to a large player interaction score. Additionally, crashes the force of which throw vehicles into the air may attract a high player interaction score. Metrics for such a crash may be the time a vehicle spends in the air or the number of somersaults it undergoes during its time in the air.

Those skilled in the art will realise that gaming session metrics, whether individual player scores or player interaction scores, may be based on many different aspects of a game. The example scoring methods given above demonstrate some of the ways in which gaming session metrics may be determined. However, the invention is not limited to the above examples and may be implemented using many other scoring methods dependent on the particular game and game format.

The game server network interface 22 is adapted to receive the gaming session metrics transmitted from the computer game terminals 2a, 2b, 2c and pass them to the score calculation means 24. The score calculation means is adapted to calculate a cumulative score for the gaming session based on the received gaming session metrics.

The score calculation means 24 may calculate a cumulative score based on one or more individual player scores, one or more player interaction scores or any combination of individual player scores and player interaction scores.

For instance the cumulative score may be based on the times taken to complete a lap by each of the players involved in the online gaming session. A high score may therefore indicate that the gaming session was particularly fast paced. Alternatively the cumulative score may be based on the drift scores of each of the players involved in the online gaming session. A high score may therefore indicate that the players each exhibit a high amount of skilful driving during the gaming session.

Combinations of scoring methods may be used to give an overall score for a gaming session. For instance the timing and drift scores for each player mentioned above may be used in combination with the number of times that the lead has changed hands in order to provide a score that gives an impression of the overall entertainment and quality of the session as well as the skill level of the players in the session. In this way the scores of less able players do not strongly influence the overall score awarded to the gaming session. If less able players are involved in a gaming session with more able players then the less able players are able to be associated with a gaming session that achieves a high score. Such high scores would not be possible for less able players using the scoring systems of the prior art.

Figure 5:
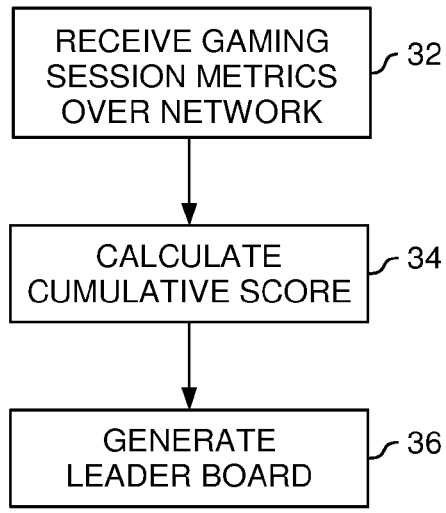
FIG. 5 shows a flow diagram of the main process steps for receiving gaming session metrics at a game server, calculating a cumulative score and generating an online leaderboard.

In accordance with the invention the game server 8 may additionally be adapted to generate one or more leaderboards. Referring to FIG. 5 there is shown a flow diagram of the main process steps for calculating a cumulative score and generating a leaderboard. The gaming session metrics are received over the network 32, a cumulative score is calculated 34 as described above and stored in memory. This process may be repeated for one or more gaming sessions. Leaderboards may then be generated comprising the cumulative scores of a plurality of gaming sessions.

The invention may provide leaderboards that allow players to see which games were the greatest. On such leaderboards, players may see the details of the game session such as when it took place, what environment it took place on etc, as well as details of every player who took part, no matter how well, or badly, that player performed. The comparison with team sports fits well here. If it is the cup final and you have a bad match but your team wins, you still get a medal.

The leaderboards may also be stored in memory at the game server 8. These may be accessed by users accessing online areas of a game, e.g. in the lobby area described above in relation to the player matching service. When a user accesses the lobby area via a computer game terminal 2a, the leaderboards may be displayed on the display 16 of the terminal 2a Alternatively the leaderboards may be transmitted over the network 6 to computer game terminals 2a, 2b, 2c, where they may be stored for display when users engage in gaming sessions for the relevant game for which the leaderboard has been generated. Updates may be transmitted to the stored leaderboards at regular intervals or when required as gaming sessions move up and down the rankings.

The leaderboards of the invention may show the highest scoring online gaming sessions. The leaderboards of the invention may be made available by the game server 8 via the network interface 22 and the network 6 to the computer game terminals 2a, 2b, 2c. Players may thereby access the leaderboards to see which are the highest ranking online gaming sessions.

In addition the gaming session metrics used to generate leaderboards may be filtered. This filtering of the gaming session metrics allows multiple leaderboards to be generated, each relating to a different gaming session metric or combination of gaming session metrics. For example a leaderboard may be generated that comprises the gaming sessions including the fastest player timings and a leaderboard may be generated that comprises the most exciting or entertaining gaming sessions.

Leaderboards may also be generated by the game server 8 on a temporal basis. A leaderboard may therefore comprise the highest scoring gaming sessions over the course of a day, a week, a month, a year or any other period of time. Such temporally based leaderboards may be used in conjunction with the filtering described above to e.g. provide a leaderboard comprising the fastest or most entertaining gaming sessions of the day, week, month or year.

The leaderboards may be made available to players of the game when they log on to the online areas of the game. In particular, the temporally based leaderboards may be made available to players of the game in this way to highlight the current highest scoring gaming sessions. The leaderboards may therefore be displayed to users as soon as they enter a lobby area. There may also be determined by the game server 8 a gaming session of the day, week, month, year or other time period. A particular gaming session having particular characteristics based on its cumulative score may be highlighted to users when they enter a lobby area. Players of the game may thereby be informed of particularly noteworthy gaming sessions. The above methods of displaying cumulative scores of gaming sessions to users of a game may motivate players who do not feature in high ranking gaming sessions to continue to play the game and contribute to such a gaming session.

By using the method of operating an interactive computer game described above a gaming session may be awarded a score in addition to scores awarded to players. Players with relatively less ability are thereby able to contribute to gaming sessions that achieve high scores and feature highly ranked in online leaderboards. By including in the cumulative score the individual scores of a plurality of players and/or the player interaction scores of a gaming session the invention reduces the impact of low scoring individuals on the cumulative score.

The gaming session metrics may be transmitted to the game server 8 following completion of a gaming session. Additionally, gaming session metrics may be transmitted to the game server during a gaming session.

Figure 6:
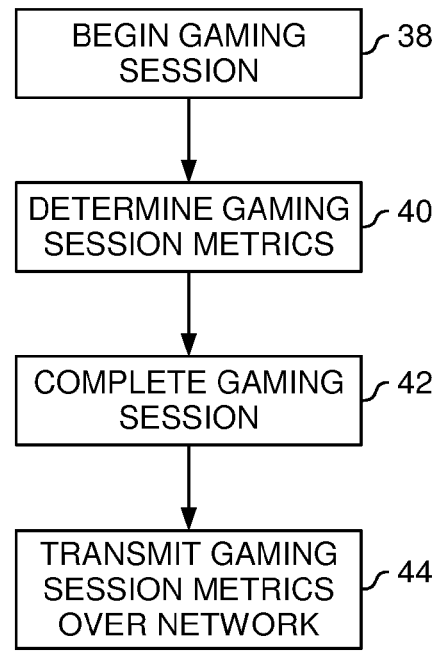
FIG. 6 shows a flow diagram of the main process steps for determining and transmitting gaming session metrics from a computer games terminal over a network.

Referring to FIG. 6 there is shown a flow diagram of the main process steps for transmitting gaming session metrics after completion of a gaming session. A gaming session is begun 38, gaming session metrics are determined 40 during the gaming session as described above and the gaming session is completed 40. The determined gaming session metrics may be stored in a memory of the computer game terminal. Following completion of the gaming session, gaming session metrics are transmitted 44 over the network 6. This method allows the game server 8 to generate leaderboards of past gaming sessions and display them to users via displays 16 in computer game terminals 2a, 2b, 2c as described above.

Figure 7:
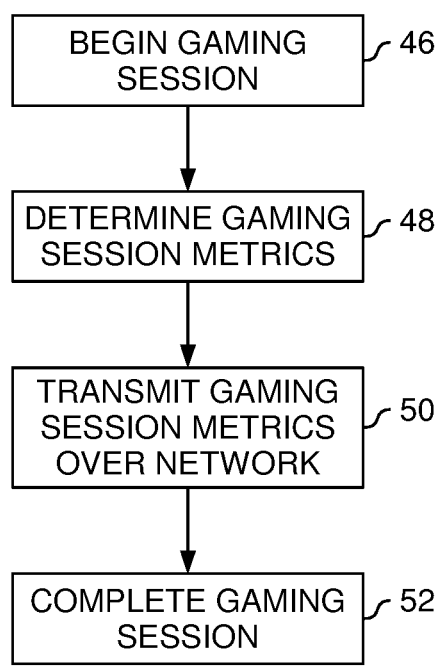
FIG. 7 shows a flow diagram of the main process steps for determining and transmitting gaming session metrics over a network in real time whilst in a gaming session.

Referring to FIG. 7 there is shown a flow diagram of the main process steps for transmitting gaming session metrics during a gaming session. A gaming session is begun 46 and gaming session metrics are determined 48. The gaming session metrics are then transmitted over the network 50 during the gaming session and before completion of the gaming session 52.

The transmission of the gaming session metrics may be done in real time. Gaming session metrics are received by the game server 8 and cumulative scores may be calculated while the gaming session is in progress. This means that a "live" cumulative score may be calculated for a gaming session. The live cumulative score may be made available via the network interface 24 over the network 6 while the gaming session is in progress. The live cumulative score may be made available to users of the interactive computer game via the lobby hosted by the game server 8 and mentioned above in connection with the player matching service. When users enter the lobby gaming sessions currently being played that are achieving high cumulative scores may be displayed on the display 16 of their computer games terminal 2a, 2b, 2c.

Making live cumulative scores available in the lobby for display to users and players while the gaming session is in progress allows users of computer game terminals 2a, 2b, 2c to monitor the score awarded to the gaming session. This may be done by users that are not participating in the gaming session. Users that are not participating may decide to participate based on the live cumulative score accessed over the network 6. Alternatively, users not participating may decide to spectate a gaming session based on the live cumulative score. Additionally, the game server 8 may issue alerts to users that are accessing online areas of the game that a gaming session having a particular live cumulative score is underway. They may then be invited to spectate or to join the gaming session based on the live cumulative score.

Embodiments of the invention may include a video game device capable of executing a video game program that incorporates the applications in arrangements discussed above. While such an interactive game program can be executed under any computer system capable of communicating with other devices, the following description is directed to an interactive game program being executed by an interactive game device (e.g., a particular example of an information processing device or computing device) which may be a standalone device for one or more users or a device capable of communicating with other devices. The invention is not limited to use of a particular interactive game device, but may be implemented with any interactive game device capable of executing an interactive game program according to the present invention, such as a portable interactive game device, an interactive game device adapted for use with a television or other monitor, a computer such as a desktop, laptop, notebook, or other computer, a telephone such as a cellular phone, or any other electronic device adapted for running an interactive game program including the animation methods of the invention.

Figure 8:
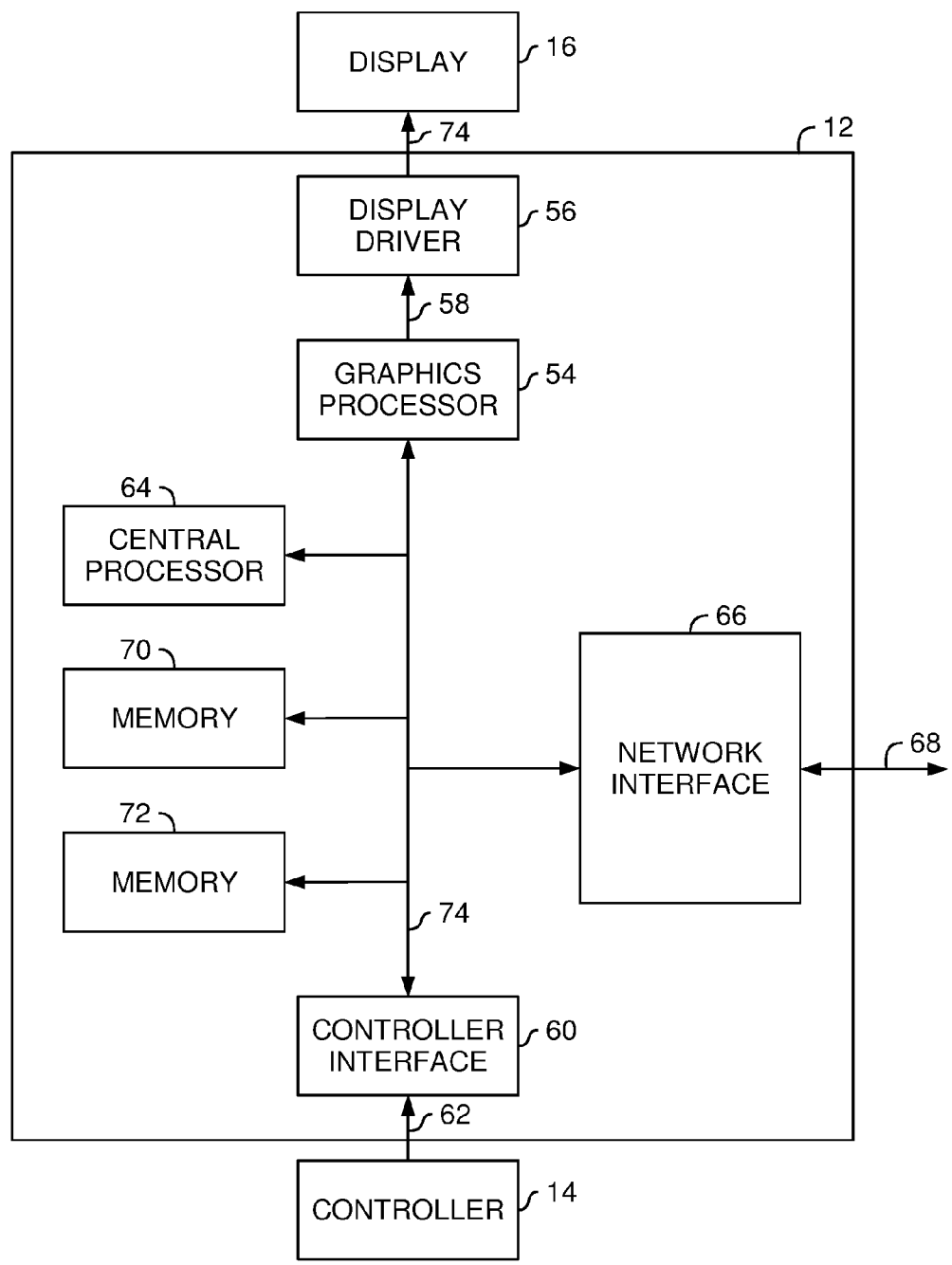
FIG. 8 illustrates the main functional elements of a computer games console as known in the art.

An example interactive game device or system is shown in FIG. 8, and denoted by reference numeral 12. The device includes a graphics processor 54 controlling a display driver 56 via a graphics bus 58, a controller interface 60 receiving controller data on a controller interface bus 62, a central processor unit (CPU) 64, a network interface 66 connected to a network bus 68, and memory modules 70 and 72. A system bus 74 connects various elements. The display driver 56 drives the display 16 via display bus 74.

The example interactive game device may include one or more monitors on which graphics may be displayed such as one or more LCDs (Liquid Crystal Display) and such a display or monitor may be provided within the game housing or as a separate monitor (such as a television). While LCDs are one preferred embodiment, the monitor or display device may be of any other suitable type, e.g., an EL (Electro Luminescence) display device. Moreover, the resolution of the monitor or display device is not limited to the particular resolution used herein. One or more speakers allowing game sounds to pass through may also be provided as part of the interactive game device or external speakers may be used such as provided in a television or attached to the game device. The interactive game device may include user input or interface devices such as a set of input devices that may include typical video game input devices such as a cross-shaped switch, a start switch, a select switch, an A button, a B button, an X button, a Y button, a power switch, a left or L button, a right or R button, and the like such as a touch screen or peripherals such as a joystick. Another input device is a touch panel or screen attached on the screen of a second LCD. The housing in many embodiments includes slots for accommodating a memory card (e.g., a game cartridge). The memory card or game cartridge is a storage medium storing the interactive game program run by the interactive game device and, typically, for storing the animations described herein. In other embodiments, though, the interactive game program(s) and graphics may be accessed via a communications network such as the Internet (as described herein).

In implementations in which the video game device is a portable device or is a device that is linked to a television or other monitor/speaker system, the internal configuration of the video game device may include a CPU 64 mounted on an electronic circuit board positioned in the game housing. The CPU 64 may be connected to an input/output interface circuit, one or more GPU (Graphics Processing Unit) 54 and a monitor controller as display driver 56 such as via bus 74. A connector or memory interface may be provided for receiving a memory card, which may include ROM storing the video game program including the animations and RAM such as for rewritably storing backup data. The video game program stored in the ROM of the memory card is typically loaded to the RAM, and the loaded video game program is executed by the CPU during operation of the video game device. In addition to the video game program, the RAM also stores temporary data produced while the CPU is running a program. The input/output circuit may be connected to the user inputs or control switch section (e.g., user interface) and monitor. Video RAM or VRAM may be used to provide storage of animations or images rendered according to the invention and may be stored in RAM prior to display by the GPU or other graphics controllers. Memory blocks 70 and 72 connected to bus 74 represent different possible types of memory.

As will be clear to those skilled in the art, numerous embodiments of interactive game apparatus and interactive game controllers may be used to practice the present invention, e.g., to run the methods described herein as part of an interactive video game program stored on storage medium such as memory card, game cartridge, or the like, and the above description of an interactive game device is not intended to limit the breadth of coverage. For example, the interactive game program may be stored on a disk (e.g., a CD or other data storage media) and downloaded into a computer's memory to be run or run from disk. Alternatively, the game program and its animations may be accessed by using an electronic device to access a Web site or to access (in a wired or wireless manner) memory over a digital communications network such as the Internet and the interactive game may be run remotely or after storage on local memory.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Cloud computing resources may be provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a game) or related data available in the cloud. For example, the racing game described herein could execute on a computing system in the cloud and monitor the users interacting with the game. In such a case, the racing game (or some separate program) could determine various gaming session metrics that characterize a particular gaming session and store those metrics at a storage location in the cloud. Doing so allows a user to access this information, (i.e., the gaming session metrics and a list of ranked game sessions) from any computing system attached to a network connected to the cloud (e.g., the Internet).

What is claimed is:

1. A computer-implemented method, comprising:
providing an interactive computer game comprising a plurality of independent player game components in a first group gaming session, of a plurality of group gaming sessions in an interactive computer game, wherein a plurality of players participate in each group gaming session through a respective independent player game component, wherein the independent player game components are communicably connected via a network;
receiving, via the network from the respective independent player game component for each of the plurality of players, an individual player score based on a level of performance of each player in the first group gaming session relative to each of at least one player performance metrics;
receiving, via the network, one or more player interaction metrics of the first group gaming session;
computing, by operation of one or more computer processors, an entertainment value (EV) for the first group gaming session based on the one or more player interaction metrics and each individual player score for each of the plurality of players, wherein the EV represents, to a user of the first group gaming session, a measure of entertainment value of the first group gaming session relative to other group gaming sessions; and
generating a leaderboard, wherein the leaderboard orders a subset of the plurality of group gaming sessions based on a respective EV for each group gaming session of the subset of the plurality of group gaming sessions; and
outputting the leaderboard for display.

2. A method according to claim 1, wherein the EV further represents an overall quality of the first group gaming session relative to other group gaming sessions, wherein the individual player scores reflect a respective skill of each player in the first group gaming session, wherein the EV value is computed independent of any user specified entertainment values, wherein the player performance metrics comprise one or more of: drifting on a race course; jumping an object with a racing car; slipstreaming an opponent; dodging a hazard; racing car lap times; finishing position in the gaming session; and opening up hidden game areas.

3. A method according to claim 2, wherein the player interaction metrics are distinct from the player performance metrics, wherein the one or more player interaction metrics are selected from one or more of the following: the total number of times that the lead changes hand in the first session; the total number of overtaking maneuvers in the first group gaming session; the gap between one or more players in the first group gaming session; the number of crashes in the first group gaming session; and the nature of crashes in the first group gaming session.

4. A method according to claim 3, wherein the EV is different than the player interaction metrics and the individual player scores, wherein each independent player game component is executed at a respective terminal and the one or more player interaction metrics and the individual player scores are determined at each of the group of terminals and transmitted to a game server via the network in real-time during the group gaming session.

5. A method according to claim 4, wherein the terminals are participating in an online gaming session over the network, the method further comprising accessing over the network data associated with the first group gaming session by one or more of the plurality of computer game terminals during the first group gaming session.

6. A method according to claim 5, wherein the subset of group gaming sessions is determined based on the EVs of each group gaming session in the subset for a predefined duration of time.

7. A method according to claim 6, wherein the player interaction metrics used to calculate the EVs for the leaderboard are filtered to select specific player interaction metrics.

8. A method according to claim 7, wherein at two of the independent player game components are participating in the first group gaming session displayed on a common display.

9. A method according to claim 1, wherein the group gaming session is all of the plurality of components.

10. A system, comprising:
a computer processor; and
a memory containing a program which when executed by the processor performs an operation comprising:
providing an interactive computer game comprising a plurality of independent player game components in a first group gaming session, of a plurality of group gaming sessions in an interactive computer game, wherein a plurality of players participate in each group gaming session through a respective independent player game component, wherein the independent player game components are communicably connected via a network;
receiving via the network from the respective independent player game component for each of the plurality of players: (i) an individual player score for each of the plurality of players based on a level of performance of each player in the first group gaming session relative to each of at least one player performance metrics, and (ii) one or more player interaction metrics of the group gaming session;
computing an entertainment value (EV) for the first group gaming session based on the one or more player interaction metrics and each individual player score for each of the plurality of players, wherein the EV represents, to a user of the first group gaming session, a measure of entertainment value of the first group gaming session relative to other group gaming sessions; and
generating a leaderboard, wherein the leaderboard orders a subset of the plurality of group gaming sessions based on a respective EV for each group gaming session of the subset of the plurality of group gaming sessions; and
outputting the leaderboard for display.

11. A system according to claim 10, wherein the EV further represents an overall quality of the first group gaming session relative to other group gaming sessions, wherein the individual player scores reflect a respective skill of each player in the first group gaming session, wherein the EV is computed independent of any user specified entertainment values, the system further comprising a plurality of computer game terminals connected to each other and to a game server, wherein each of the terminals executes a game component.

12. A system according to claim 11, wherein each terminal is arranged to transmit over the network the one or more player interaction metrics to the game server.

13. A system according to claim 12, wherein the player interaction metrics are distinct from the player performance metrics, wherein each of the group of terminals is further configured to transmit the one or more player interaction metrics to the game server in real-time during the first group gaming session.

14. A system according to claim 13, wherein each of the plurality of computer game terminals is configured to access over the network data associated with the group gaming session during the first group gaming session.

15. A system according to claim 14, wherein the subset of group gaming sessions is determined based on the EVs of each group gaming session in the subset for a predefined duration of time.

16. A system according to claim 15, wherein the one or more player interaction metrics are selected from one or more of the following: the total number of times that the lead changes hand in the first group gaming session; the total number of overtaking maneuvers in the first group gaming session; the gap between one or more players in the first group gaming session; the number of crashes in the first group gaming session; and the nature of crashes.

17. A computer game terminal to compute an entertainment value (EV) of a group gaming session within an interactive computer game on a network comprising a plurality of computer game terminals connected to each other and to a game server via a network, the computer game terminal comprising:
a game console comprising a central processor configured to perform an operation comprising:
providing an interactive computer game comprising a plurality of independent player game components in a first group gaming session, of a plurality of group gaming sessions, wherein a plurality of players participate in each group gaming session through a respective game console;
receiving, via the network from the respective independent player game console for each of the plurality of players, an individual player score based on a level of performance of each player in the first group gaming session relative to each of at least one player performance metrics;
receiving, via the network, one or more player interaction metrics of the first group gaming session;
computing the EV for the first group gaming session based on the one or more player interaction metrics and each individual player score for each of the plurality of players, wherein the EV represents, to a user of the first group gaming session, a measure of entertainment value of the first group gaming session relative to other group gaming sessions; and
generating a leaderboard, wherein the leaderboard orders a subset of the plurality of group gaming sessions based on a respective EV for each group gaming session of the subset of the plurality of group gaming sessions; and
outputting the leaderboard for display.

18. A game server, comprising:
a processor; and
a memory containing a program which when executed by the processor performs an operation comprising:
providing an interactive computer game comprising a plurality of independent player game components in a first group gaming session, of a plurality of group gaming sessions, wherein a plurality of players participate in each group gaming session through a respective independent player game component, wherein the independent player game components are communicably connected via a network;

receiving, via the network from the respective independent player game component for each of the plurality of players, an individual player score based on a level of performance of each player in the first group gaming session relative to each of at least one player performance metrics;

receiving, via the network, one or more player interaction metrics of the first group gaming session;

computing, by operation of one or more computer processors, an entertainment value (EV) for the first group gaming session based on the one or more player interaction metrics and each individual player score for each of the plurality of players, wherein the EV represents, to a user of the first group gaming session, a measure of entertainment value of the first group gaming session relative to other group gaming sessions; and generating a leaderboard, wherein the leaderboard orders a subset of the plurality of group gaming sessions based on a respective EV for each group gaming session of the subset of the plurality of group gaming sessions; and outputting the leaderboard for display.

19. A non-transitory computer readable storage medium containing a program which, when executed by a processor, performs an operation comprising:

providing an interactive computer game comprising a plurality of independent player game components in a first group gaming session, of a plurality of group gaming sessions in an interactive computer game, wherein a plurality of players participate in each group gaming session through a respective independent player game component, wherein the independent player game components are communicably connected via a network;

receiving, via the network from the respective independent player game component for each of the plurality of players, an individual player score based on a level of performance of each player in the first group gaming session relative to each of at least one player performance metrics;

receiving, via the network, one or more player interaction metrics of the first group gaming session;

computing, by operation of one or more computer processors, an entertainment value (EV) for the first group gaming session based on the one or more player interaction metrics and each individual player score for each of the plurality of players, wherein the EV represents, to a user of the first group gaming session, a measure of entertainment value of the first group gaming session relative to other group gaming sessions; and generating a leaderboard, wherein the leaderboard orders a subset of the plurality of group gaming sessions based on a respective EV for each group gaming session of the subset of the plurality of group gaming sessions; and outputting the leaderboard for display.

20. A computer readable storage medium according to claim 19, wherein the EV further represents an overall quality of the first group gaming session relative to other group gaming sessions, wherein the individual player scores reflect a respective skill of each player in the first group gaming session, wherein the EV is computed independent of any user specified entertainment values, wherein the interactive computer game is provided by a game server and accessed via the network by a plurality of computer game consoles participating in the online gaming session and connected to each other and to the game server, wherein each computer game console executes a respective independent player game component.

21. A computer readable storage medium according to claim 20, wherein the player performance metrics comprise one or more of: drifting on a race course; jumping an object with a racing car; slipstreaming an opponent; dodging a hazard; racing car lap times; finishing position in the gaming session; and opening up hidden game areas.

22. A computer readable storage medium according to claim 21, wherein the player interaction metrics are distinct from the player performance metrics, wherein the EV is different than the player interaction metrics and the individual player scores, wherein the one or more player interaction metrics are selected from one or more of the following: the total number of times that the lead changes hand in the first group gaming session; the total number of overtaking maneuvers in the first group gaming session; the gap between one or more players in the first group gaming session; the number of crashes in the first group gaming session; and the nature of crashes in the first group gaming session.

* * * * *